Figure 1:
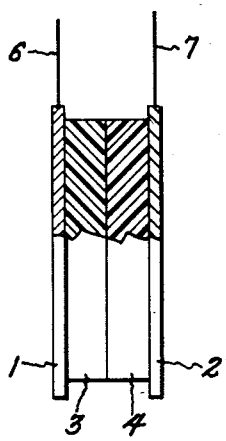

April 19, 1960     W. T. GRUBB, JR     2,933,547

SOLID STATE ELECTRIC CELL

Filed June 29, 1955

Inventor:
Willard T. Grubb, Jr.,
by Paul A. Frank
His Attorney.

United States Patent Office 2,933,547
Patented Apr. 19, 1960

2,933,547
SOLID STATE ELECTRIC CELL

Willard T. Grubb, Jr., Schenectady, N.Y., assignor to General Electric Company, a corporation of New York Application June 29, 1955, Serial No. 518,750

16 Claims. (Cl. 136—100)

This invention relates to a solid state electric cell. More particularly, this invention relates to a solid state electric cell comprising a first electrode, a second electrode, and a solid, solvated cation-exchange resin membrane sandwiched between and in electrical contact with two electrodes.

Heretofore a number of different types of solid electric cells have been known, the most widely used of these cells being the so-called flashlight battery type of dry cell. Although these flashlight-type dry cells are satisfactory for many applications, they suffer several important defects. Among these defects are the fact that the cells are subject to severe shelf life limitations, and the fact that the cell reactions found in these cells are completely irreversible, i.e. the cells are not rechargeable. In order to provide an improved type of solid state "dry" cell, it has been proposed to form electrolytic cells made up of two different electrodes with a crystalline, ion-conducting material sandwiched between the electrodes. A typical cell of this type is a so-called "fused salt" cell. However, this latter type of cell is also disadvantageous since the conductivity of the fused salt is generally so low that the voltage obtainable from the cell is only a very small fraction of the theoretical voltage obtainable from the electrode reactions involved.

I have discovered an improved type of dry cell which obviates all of the difficulties encountered in the prior art cells. The term "dry" used in connection with the cells of the present invention and of the prior art refers to an electric cell, either a primary or secondary cell, which contains no free liquid which can be removed from the cell by purely mechanical means. The term "free liquid" does not include liquids which are connected to the cell members by primary chemical bonds or by secondary Van der Waals forces. Thus, the term "dry cell" as used in the present application includes cells in which the electrolyte is made up of a hydrated salt or in which one of the electrodes is a hydrated metal oxide.

An object of the present invention is to provide an improved dry cell having a good shelf life.

A further object of the present invention is to provide a dry cell having a relatively low internal resistance and a long life.

A still further object of the present invention is to provide a type of dry cell in which the chemical reactions are reversible so that the cell is rechargeable.

These and other objects of my invention are achieved by providing a dry cell consisting of a first electrode, a second electrode, and a dry, solvated cation-exchange membrane sandwiched between and in electrical contact with the two electrodes.

Figure 2:
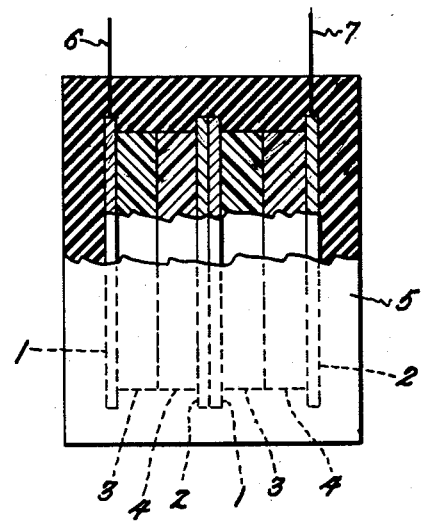
Figure 3:
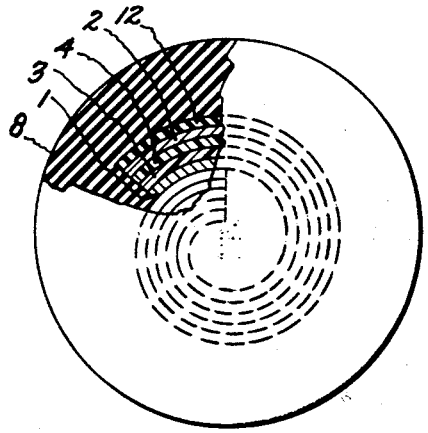
Figure 5:
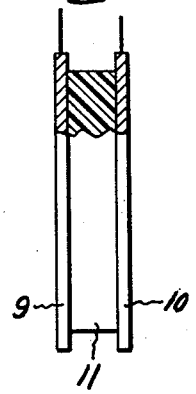
Figure 4:

The features of my invention which I believe to be novel are set forth with particularity in the appended claims. My invention itself, however, both as to its structure and method of operation, together with further objects and advantages thereof, may best be understood by reference to the following description taken in connection with the accompanying drawing in which Fig. 1 is a diagrammatic illustration, partly in section, of one embodiment of my invention; Fig. 2 is an illustration of a battery made up of a plurality of cells of the present invention; Fig. 3 is a schematic illustration of a coiled dry cell within the scope of the present invention; Fig. 4 is a view of the cell of Fig. 3 prior to coiling and encasing, and Fig. 5 is a modified embodiment of my invention.

The dry cells of the present invention are based upon my discovery that a dry, solvated cation-exchange resin membrane will serve as a superior electrolyte in a dry cell if the resin is in contact with the electrodes of the cell. The cation-exchange resins employed in the practice of the present invention include in their polymeric structure dissociable ionizable radicals, the anion component of which is fixed into or retained by the polymeric matrix with the cation component being a mobile and replaceable ion electrostatically associated with the fixed component. The ability of the cation to be replaced, under appropriate conditions, by other cations, imparts ion-exchange characteristics to these materials. These ion-exchange resins are used in the present invention in membrane form. These membranes are sheets, having a thickness much smaller than either of the other two dimensions. These ion-exchange resin membranes are characterized by their insolubility in water and both polar and non-polar organic solvents. This insolubility results from the cross-linked character of the synthetic polymeric materials employed in the membrane structure.

As is well known, ion-exchange resins are prepared by copolymerizing a mixture of ingredients, one of which contains an ionic substituent, or by reacting an ionic material with a resin polymerizate. In the case of cation-exchange resins these ionic substituents are acidic groups such as the sulfonic acid group, the carboxyl group, and the like. This ionizable group is attached to a polymeric compound such as a phenol-aldehyde resin, a polystyrene-divinylbenzene copolymer, or the like. Thus, a typical cation-exchange resin may be prepared by copolymerizing m-phenol sulfonic acid with formaldehyde. The preparation and properties of a number of different types of cation-exchange resins is described throughout the literature and in particular in "Ion Exchange," F. C. Nachod, Academic Press Inc., New York (1950); "Ion Exchange Resins," R. Kunin and R. J. Myers, John Wiley & Sons, Inc., New York (1950), and in U.S. patents such as 2,366,007—D'Alelio; 2,663,702—Kropa; 2,664,379—Hutchinson; 2,678,306—Ferris; 2,658,042—Johnson; 2,681,319—Bodamer; 2,681,320—Bodamer.

The formation of these ion-exchange resins into sheet or membrane form is also well known in the art and is described, for example, in "Amberplex Ion Permeable Membranes," Rohm and Haas Company, Philadelphia (1952), and in references mentioned in the aforementioned Rohm and Haas publication. In addition, the preparation of a plurality of different types of ion-exchange membranes is described in Patent 2,636,851—Juda et al. and in Patent 2,702,272—Kasper. In general, these ion-exchange resin membranes may be formed by one of two methods. In the first method the ion-exchange resin is cast or molded into membrane or sheet form without the addition of other bonding materials, and in the second method the ion-exchange resins are incorporated into binders which generally comprise thermoplastic resins such as polyethylene, polyvinyl chloride, methyl methacrylate, etc., and the ion-exchange resin and the binder are cast or molded into membrane form.

As a general rule ion-exchange resins are formed in aqueous solutions of various types of organic compounds so that when the membrane is formed, it is substantially saturated with water. Thus, a phenolsulfonic acid-formaldehyde ion-exchange resin is found to contain a plurality of reactive sites consisting of —$SO_3H$ radicals attached to the resin matrix with sufficient water being held in the resin matrix that the H+ ion is extremely mobile in the resin matrix. In this form the resin is described as being substantially "solvated." By "solvated" I mean that the resin contains enough of the solvation medium to substantaily saturate the resin but not enough to keep the resin wet. Although the resins as formed generally contain water as the solvation medium, with the water being held to the resin by secondary Van der Waals forces, I have found that the resin can be made "bone-dry" by subjecting the resin to a high vacuum at elevated or room temperature. In the "bone-dry" condition the resin contains only a trace of water but this is combined with the resin and does not allow mobility of the hydrogen ion in the resin. After being made "bone-dry" the resin may be resolvated by again soaking the resin in the solvation medium until substantial saturation has been obtained. Thus, a "bone-dry" resin may be resolvated with water, or any other polar liquid depending on the particular type of resin employed. In the practice of the present invention I prefer to employ resins which are solvated with either water or an aliphatic alcohol containing one or more hydroxyl groups. Among the preferred alcohols are included ethylene glycol, propylene glycol, methanol, ethanol, and glycerine.

In a cation-exchange resin the hydrogen ion in the resin may be replaced by any other type of cation by subjecting the resin in its acid form to the action of a concentrated solution of the cation. Thus, a phenol sulfonic acid formaldehyde cation-exchange resin may have all of its hydrogen ions replaced by metallic ions such as copper, silver, zinc or lead by subjecting the resin to a concentrated solution, such as a sulfate or nitrate solution, of the metal ion.

In Fig. 1 is shown the preferred dry cell of the present invention in which a first electrode 1 and a second electrode 2 are separated from each other by cation-exchange resin membranes 3 and 4. The entire cell may then be encased in any suitable plastic material (not shown) such as a phenol formaldehyde resin, a urea formaldehyde resin, an epoxide resin such as the resin formed by the reaction of bis-phenol-A and epichlorohydrin, a melamine formaldehyde resin, a synthetic rubber, polythene, etc. In the cell shown in Fig. 1 the electrodes 1 and 2 are constructed of materials having different electrode potentials, and for convenience electrode 2 will be considered as having the more positive electrode potential, although it is obvious that the two electrodes can be reversed. Cation-exchange resin membranes 3 and 4 can be two separate membranes which are held together by any suitable means or can be a single membrane containing two types of properties.

In one embodiment of my invention, membrane 3 is a cation-exchange resin membrane which has been solvated with water and which has as its active cation the metallic cation corresponding to the metal of electrode 1. Cation-exchange membrane 4 is also a water solvated membrane which has active cations which correspond to the metal of electrode 2.

In a specific embodiment, electrode 1 is silver, membrane 3 is a membrane containing silver cations which has been formed by subjecting a phenol sulfonic acid-formaldehyde cation-exchange resin to the action of a saturated silver nitrate solution and which has then been leached free of the silver sulfate solution by distilled water. Electrode 2 is constructed of zinc and cation-exchange membrane 4 has been prepared from a phenol sulfonic acid-formaldehyde ion-exchange resin in which the active cations are zinc. This membrane is prepared by subjecting the acid form of the resin to the action of a zinc sulfate solution until cation exchange has taken place with subsequent leaching out of the zinc sulfate solution with distilled water. In the operation of this cell, lead 6 which is in electrical contact with electrode 1, and lead 7, which is in electrical contact with electrode 2, are connected across a load. This results in a cell voltage of about 1.5 volts. While current is being drawn from the cell, silver ions from the resin are being reduced to metallic silver at electrode 1. At the same time metallic zinc is being oxidized to Zn++ ions.

Instead of manufacturing the cell of Fig. 1 by the method discussed above, the same cell can be prepared by placing electrodes 1 and 2 into electrical contact with a single ion-exchange resin membrane. Where electrode 1 is formed of silver and electrode 2 is formed of zinc, the ion-exchange resin should contain zinc cations as the mobile ion. This cell is then charged by placing a potential across electrodes 1 and 2 with electrode 1 being more positive than electrode 2. In this case, silver from electrode 1 will be oxidized and the resulting silver ions will go into the matrix of the ion-exchange resins. At the same time, zinc ions in the ion permeable membrane will be reduced and deposited on zinc electrode 2. The net result of the charging of this cell will be to establish two zones in the ion-exchange membrane. The first zone will correspond to membrane 3 in Fig. 1 in which the cation in the membrane contains silver ions and the second zone will correspond to membrane 4 in Fig. 1 in which the cation is zinc.

Although the cell shown in Fig. 1 in which water is the solvating medium for membranes 3 and 4 is perfectly satisfactory for most applications, it is sometimes desirable to employ cells characterized by an even longer operating life than that of the water solvated cells. I have discovered unexpectedly that if the solvating medium is an aliphatic alcohol such as methanol, ethanol, ethylene glycol, propylene glycol, glycerine, etc., the total energy output of the cell is higher and its shelf life is longer than when aqueous solvation is employed. This alcoholic solvation apparently results in an increase in internal resistance of the cell so that the maximum voltage obtainable in the cell is lowered but the current from the cell becomes more steady. In addition, these alcohols alone or mixed with water allow operation of cells over a much greater length of time.

In Fig. 2 is shown a battery made up of a plurality of cells of the type shown in Fig. 1. This battery is formed by placing a plurality of the cells of Fig. 1 in series with electrode 1 of each cell unit contacting electrode 2 of each adjacent cell unit. A suitable casing 5 surrounds the battery. As in the case of the cells of Fig. 1, the cells may be formed using two separate membranes 3 and 4 with different cations or by using only a single cation exchange membrane between electrodes 1 and 2 and charging the entire battery after the battery is assembled.

In Figs. 3 and 4 is shown a cell of the same general structure as that of Fig. 1 except that the cell is formed in a rolled or coiled cylindrical form. This results in a cell with a large area of contact between the membranes and the electrodes so that a high current capacity cell may be formed. This cylindrical type cell may be encased in any type of container 8, preferably a plastic container of the general type described in connection with the cell of Fig. 1. This cell comprises electrodes 1 and 2 and membranes 3 and 4 corresponding to those elements described for Fig. 1. In addition, this cell contains a layer of electrically insulating material 12 adjacent electrode 2. This layer may consist of any suitable material, such as paper, nylon, polyethylene, natural or synthetic rubber, silicone rubber, methyl methacrylate, and alkyd varnish, etc. After the electrode, membranes, and insulating material of Fig. 4 are formed into a laminated strip, the strip may be rolled up and encased in any suitable material 8 to form the cell of Fig. 3. Suitable electrical leads (not shown) connected to electrodes 1 and 2 extend through the casing 8 so that the cell of Fig. 3 may be connected to any desired load.

The cell of Fig. 5 differs from those of previous figures in that the ion-exchange resin which separates the two electrodes 9 and 10 contains only one type of cation. In describing the cell of this figure, metal electrode 10 will be considered as having a more positive electrode potential than metal electrode 9. In this cell, cation-exchange resin 11 contains cations corresponding to the metal in electrode 9. Thus, where electrode 9 is formed of copper and electrode 10 is formed of aluminum, ion-exchange resin 11 will have copper as the mobile cation. As in the case with cells previously described, the ion-exchange resin of Fig. 2 may be solvated with either water or with an aliphatic alcohol such as methanol, ethanol, ethylene glycol, propylene glycol, or glycerine, etc.

The cell of Fig. 5 offers certain disadvantages when compared with the cells of Figs. 1–4 in that the cell of Fig. 5 has a relatively short life because of plating out of the cation in the cation-exchange resin 11 onto the surface of electrode 10. As soon as electrode 10 is covered with the metal corresponding to the cation in the resin, the potential between the two electrodes has been dissipated and the cell becomes inoperative. However, for specialized applications where only a short cell life is necessary, the cells of Fig. 5 are perfectly satisfactory.

In the cells of the present invention, the limiting factor in the total energy output is the number of cations corresponding to those in cation permeable membrane 3 of Figs. 1–4. Since the actions in this membrane are being used up during the cell reaction, the reaction can take place as long as the supply of cations is left in the membrane. Thus, in the cells where electrode 1 is copper, electrode 2 is zinc, membrane 3 contains copper ions and membrane 4 contains zinc ions, the total energy output of the cell is limited by the relative number of copper ions in membrane 3. The purpose of membrane 4 of the cells of the present invention is to prevent the plating of copper, which is formed by reduction of the copper ions, onto zinc electrode 2. When copper plates out on electrode 2, the effective electrode area is reduced.

The relative sizes of the various components of the cells of Figs. 1–4 may vary within extremely wide limits depending only on the desired total energy output of the cell and the desired "shelf life" of the cell. By increasing the thickness of membrane 4 the shelf life of the cell can be increased, at a sacrifice of internal resistance in the cell, since the ions which serve as conductors in the cell have further distance to travel. The total energy output is controlled by the thickness of membrane 3. In practice, I have found that electrodes 1 and 3 can be of any thickness from a foil thickness of as low as 1 mil up to the thickness of bar stock of the electrode material which can vary from an eighth inch upwards. With regard to the thickness of membranes 3 and 4, we have obtained satisfactory operation of the cells with membrane thickness as low as 3–4 mils and with membrane thicknesses as high as ⅛–¼ inch. However, I prefer to employ membranes on the order of 15–25 mils thick with the electrodes being in the neighborhood of 2–5 mils thick. In this way, a cell with a satisfactory life and total energy capacity is provided which occupies a relatively small space. The surface area of contact of the cell elements may be varied within almost infinite limits, since the cell voltage is dependent only upon the resistance per unit cross-sectional area of the cell. By varying the area of contact between the membranes the total energy output of the cell is varied in proportion. In practice, satisfactory cells can be prepared having an area of contact between the various members in the cell of from less than one square centimeter up to more than one square foot.

The shape of the elements employed in the cells of Figs. 1, 2 and 5 is immaterial to the operation of the cell. However, for convenience we prefer to employ those which are disk-shaped, square, or rectangular.

In describing particular cells within the scope of the present invention a conventional shorthand nomenclature will be employed to describe the various components of the cell. Thus, the designation $$Ag|Ag^+|Zn^{++}|Zn \tag{1}$$

for a cell indicates that one of the electrodes in the cell is formed of silver, the cation-exchange membrane adjacent this cell contains silver ions as the mobile ion, the membrane adjacent the silver membrane contains zinc ions as the mobile ion, and the second electrode which is adjacent the zinc ion membrane is formed of metallic zinc.

The following examples are illustrative of the practice of my invention and are not for purposes of limitation.

*Example 1*

A cation-exchange resin is prepared by reacting approximately 1 part by weight of a 35% aqueous formaldehyde solution and 2 parts by weight of a 65% aqueous phenol sulfonic acid solution. These two reactants are shaken together and heated at a temperature of about 75° C. in a closed container so that the moisture and formalydehyde are retained. After about four hours a hard resinous product is formed containing —$SO_3H$ groups attached to the aromatic nucleus. This resin is then ground into fine particles and 2 parts by weight of the resin are mixed with 1 part by weight of a finely divided polyethylene. This mixture is then pressed into sheets or membranes in a suitable press at temperatures of about 90–120° C. to form structures having the desired thickness. In this particular example the resulting sheet is formed with a 25 mil thickness. A ten centimeter square section of this sheet is soaked for three to four hours in a saturated copper sulfate solution and a second ten square centimeter sheet is soaked in a saturated zinc sulfate solution for the same period of time. At the end of this time each of the sheets are soaked in distilled water for five to six hours to leach out all of the sulfate present in the membrane structure. At the end of this leaching period, the first of these diaphragms contains copper as the mobile cation and the second of the membranes contained zinc as the mobile cation. A cell is constructed by placing the copper cation-exchange membrane on a ten mil thick copper plate having an area of about 10 square centimeters, the zinc cation-exchange membrane is placed adjacent the copper cation-exchange membrane, and a ten mil thick zinc electrode is placed adjacent the zinc cation-exchange membrane. Four elements of the cell are then rigidly clamped together with an insulated clamp and suitable leads are connected from the copper electrode and from the zinc electrode. Measurement of the potential between the two electrodes under open circuit conditions at room temperature indicates that the cell has a voltage of approximately 1.1 volts which is equivalent to the theoretical voltage expected from a copper-zinc cell.

*Example 2*

A cation-exchange resin is prepared from the same ingredients in the same proportions and under the same conditions as set forth in Example 1 except that the mixture is only partially polymerized at first to form a viscous phenol sulfonic acid formaldehyde polymer. This polymer is then cast into sheet form and further cured at a temperature of about 75° C. for several hours until a thoroughly rigid, cross-linked cation-exchange polymer in sheet form has been prepared. Thus, the cation-exchange membrane of the present example differs from that of Example 1 in that no binder is used to form the membrane. This membrane is then cut into two ten centimeter square sections and a copper cation-exchange membrane and a zinc cation-exchange membrane are prepared by the method of the preceding example. These two membranes are incorporated into a cell containing a copper electrode formed of ten mil copper sheet and a zinc electrode formed of ten mil zinc sheet and clamped together to form a uniform structure. Measurement of the potential between the copper and the zinc electrode again indicates that the open circuit voltage between the two electrodes is 1.1 volts at room temperature compared with the theoretical value of 1.1 volts for a copper-zinc cell.

*Example 3*

In this example metallic cation-exchange membranes are prepared from Amberplex C–1 cation membranes (Rohm and Haas Co.) using as a starting material the acid form of the membrane which contains —SO₃H groups attached to the resin matrix. These membranes are obtained by first polymerizing a mixture of about 92 parts by weight of styrene and about 8 parts by weight of divinyl benzene. The resulting polymer is comminuted to fine particles and 100 parts by weight of this finely divided polymerizate is sulfonated by reaction with about 175 parts of chlorosulfonic acid. This reaction is carried out by heating the mixture at its reflux temperature for about 3 minutes and then maintaining the mixture at room temperature for an additional 50 hours. The sulfonated product is then treated with a large excess of water to destroy the excess of chlorosulfonic acid and any acid chlorides which are formed. This results in a sulfonated resin containing 3.1 milliequivalents of mobile hydrogen ions per gram of resin. After drying this sulfonated resin, 2 parts by weight of the dried resin are mixed with 1 part by weight of polyethylene and the resulting mixture is pressed into sheet or membrane form. The resulting membrane contains 2.1 milliequivalents of mobile hydrogen ions per gram of membrane. When this dried membrane is soaked in water the resulting solvated product contains about 45% by weight of water. The membranes containing metallic ions which are used in this example are all prepared by soaking the membrane in a salt solution of the proper metal for a period of from 3–4 hours. In the case of the membranes with silver as the mobile ion the salt solution employed is a saturated silver nitrate solution. In the case of the other metallic ions, the salt solution employed is a saturated sulfate solution. After the membranes are converted into their metallic ion form, they are leached with distilled water to remove all of the metal salts from the membrane to yield a membrane in which the active ion is a metal ion and in which the solvation medium is water. All of these membranes are then allowed to dry in air so that they no longer contain any free water. A plurality of cells such as are described in Fig. 1 are prepared using various combinations of metals for the electrodes. In each case, the thickness of the cation-exchange membranes is about 25 mils and the thickness of the metal electrodes is the same. Listed below are the particular cells prepared and the open circuit voltages of these cells as measured by a Leeds and Northrup box potentiometer.

| Cell | Theoretical E.M.F. (25.00° C.) | Observed E.M.F. (room temp.) |
| --- | --- | --- |
| | V. | V. |
| Cu/Cu++/Zn++/Zn | 1.100 | 1.11 |
| Ag/Ag+ Zn++/Zn | 1.56 | 1.44–1.48 |
| Ag/Ag+ Cd++/Cd | 1.20 | 1.12 |
| Ag/Ag+/Pb++/Pb | 0.925 | 0.86 |
| Pb/Pb++/Zn++/Zn | 0.637 | 0.61 |
| Cu/Cu++/Pb++/Pb | 0.463 | 0.40 |
| Pb/Pb++/Cd++/Cd | 0.277 | 0.26 |
| Ag/Ag+/Ni++/Ni | 1.05 | 0.48 |
| Cu/Cu++/Mg++/Mg | 2.71 | 1.2 |

*Example 4*

This example describes a cell corresponding to the structure of Fig. 5. Using a 25 mil Amberplex C–1 cation-exchange membrane which has been converted to its copper form by the copper sulfate and the distilled water leaching process described in connection with the previous example, a cell is formed by clamping a section of this copper ion membrane between a 10 mil copper electrode and a 10 mil aluminum electrode, with the area of contact between the elements of the cell being about 10 square millimeters. This cell is found to have an E.M.F. of 0.5 volt when measured with a Leeds and Northrup box potentiometer.

*Example 5*

This example describes the preparation of a cell in which the solvating medium for the ion permeable membrane is ethylene glycol instead of water. A 6 square centimeter section of Amberplex C–1 cation-exchange resin is soaked in aqueous silvere nitrate for about 4 hours to form a membrane in which the mobile cation is silver. A similar membrane is soaked in zinc sulfate to form a cation exchange membrane having zinc as the mobile cation. Both of these membranes are then leached in distilled water until all of the metal salts are removed. At this time the membranes are water solvated. The water solvated membranes are then converted to the ethylene glycol solvated membranes by subjecting the membranes to vacuum in the presence of ethylene glycol. These membranes are incorporated into a cell having a structure corresponding to that shown in Fig. 1 with the following chemical characteristics:

$$Ag/Ag^+/Zn^{++}/Zn$$

Measurement of the potential of this cell discloses open circuit voltage of 1.3 volts as compared with the theoretical E.M.F. at 25° C. of 1.56 volts. This cell is then connected in a circuit containing a voltmeter, an ammeter, and a total resistance of 0.25 megohm. Periodically the voltage and current are read from the respective meters and found to be as listed in the table below. At the end of the 919 hour test period the open circuit voltage remained unchanged.

| Elapsed Time (hours) | E.M.F. (volts) | Current ($\mu$ amps.) |
| --- | --- | --- |
| 0 | .80 | 3.0 |
| 41 | 1.07 | 4.3 |
| 140 | 1.04 | 4.1 |
| 213 | 1.04 | 4.2 |
| 309 | 1.03 | 4.2 |
| 405 | 1.03 | 4.2 |
| 501 | 1.04 | 4.2 |
| 645 | 1.07 | 4.3 |
| 813 | 1.09 | 4.3 |
| 919 | 1.09 | 4.3 |

*Example 6*

A cell similar to that prepared in Example 5 is prepared with a cadmium electrode in place of the zinc electrode and with a cadmium ion-exchange resin in place of the zinc ion-exchange resin. The chemical structure of this cell is as follows:

$$Ag/Ag^+/Cd^{++}/Cd$$

This cell is connected into the same circuit described in Example 5 and the relationship between the current and voltage of the cell at given elapsed times is listed in the table below.

| Elapsed Time (hours) | E.M.F. (volts) | Current ($\mu$ amps.) |
| --- | --- | --- |
| 0 | 0.74 | 0.7 |
| 24 | 0.99 | 1.0 |
| 66 | 1.04 | 1.0 |
| 92 | 1.05 | 1.0 |
| 115 | 1.05 | |
| 141 | 1.05 | |
| 163 | 1.04 | |
| 220 | 0.67 | |
| 248 | 0.67 | |
| 272 | 1.02 | |
| 296 | 0.59 | |
| 360 | 0.52 | |
| 385 | 1.02 | |
| 410 | 1.03 | 1.0 |

Example 7

A cell similar to that described in Example 5 except that the solvation medium is ethanol instead of ethylene glycol is prepared from a water solvated silver cation membrane and a zinc cation membrane by evacuating the water from the membrane in the presence of absolute ethanol. This cell is then assembled into a unit having the following chemical characteristics:

$$Ag/Ag^+/Zn^{++}/Zn$$

After connecting this cell into the circuit described in Example 5, the voltage and current at various elapsed times is as follows:

| Elapsed Time (hours) | E.M.F. (volts) | Current ($\mu$ amps.) |
| --- | --- | --- |
| 0 | 0.81 | 0.8 |
| 70 | 0.73 | 0.7 |
| 100 | 0.70 | 0.7 |
| 120 | 0.69 | 0.7 |
| 140 | 0.68 | 0.7 |
| 155 | 0.68 | 0.7 |
| 185 | 0.67 | 0.7 |
| 234 | 0.65 | |
| 260 | 0.65 | |
| 283 | 0.64 | |
| 309 | 0.64 | |
| 331 | 0.64 | |
| 390 | 0.61 | |
| 418 | 0.61 | |
| 438 | 0.60 | |
| 462 | 0.60 | |
| 496 | 0.58 | |
| 550 | 0.55 | |
| 575 | 0.56 | |
| 600 | 0.56 | 0.6 |
| 900 | 0.51 | 0.5 |
| 2,500 | 0.52 | 0.5 |

Although the foregoing examples have described the present invention in connection with only several specific cation-exchange membranes, it should be understood that the type of cation-exchange resin membrane is unimportant for purposes of the present invention, the only requirement being that a cation-exchange resin be convertible to a form in which the mobile cation in the resin corresponds to the cation of the metal electrode with which it is associated. Since all cation-exchange resins exhibit the property of permitting any one cation being exchanged for any other cation, any such resin is acceptable. Since any ion-exchange resin may be incorporated into a membrane by means of a suitable binder or be molded directly into the form of a membrane, any such ion-exchange resin is again usable. As typical examples of suitable ion-exchange resins and ion-exchange resin membranes, reference is again made to the literature and the patent references heretofore mentioned.

Although the present invention has been described in the examples in connection with only a few different metals for electrodes, it should be understood that any metal pair having different electrode potentials may be used for the two electrodes of the cell.

The cells of the present invention exhibit the same utility as do all other primary and secondary electric cells. Thus, these cells may be used alone or combined into batteries to power incandescent lamps, electronic equipment, electric motors, and the like. These cells are particularly useful for application under conditions where long shelf life is desired since the cells may be prepared to have any desired shelf life. In addition, the cells are advantageously used in applications where the cell can be recharged after the cell is completely discharged so that the same cell may be used over and over again instead of requiring complete replacement.

What I claim as new and desire to secure by Letters Patent of the United States is:

1. A cell free of mechanically removable fluid comprising a first metal electrode, a first cation permeable ion-exchange resin membrane in direct contact with said first metal electrode, a second cation permeable ion-exchange resin membrane in direct contact with said first membrane, and a second metal electrode in direct contact with said second membrane, said first membrane having as its mobile cation a cation of the metal of which said first electrode is composed, said second membrane having as its mobile cation a cation of the metal of which said second electrode is composed, said second electrode being formed of a metal which has an electrode potential different from the electrode potential of said first electrode, and said first membrane and said second membrane being substantially saturated with a polar liquid.

2. The cell of claim 1 in which said first membrane and said second membrane are substantially saturated with water.

3. The cell of claim 1 in which said first membrane and said second membrane are substantially saturated with an aliphatic alcohol.

4. The cell of claim 1 in which said first membrane and said second membrane are substantially saturated with ethylene glycol.

5. The cell of claim 1 in which said first membrane and said second membrane are substantially saturated with ethanol.

6. The cell of claim 1 in which said first membrane and said second membrane comprise a synthetic organic resin polymer.

7. The cell of claim 1 in which said first membrane and said second membrane comprise a phenol sulfonic acid formaldehyde polymer.

8. The cell of claim 1 in which said first membrane and said second membrane comprise a sulfonated divinyl benzene polymer.

9. A battery comprising a plurality of serially connected dry cells free of mechanically removable fluid, each of said dry cells comprising a first metal electrode, a first cation permeable ion-exchange resin membrane in direct contact with said first metal electrode, a second cation permeable ion-exchange resin membrane in direct contact with said first membrane, and a second metal electrode in direct contact with said second membrane, said first membrane having as its mobile cation, a cation of the metal of which the first electrode is composed, said second membrane having as its mobile cation a cation of the metal of which said second electrode is composed, said second electrode being formed of a metal having an electrode potential different from the electrode potential of said first metal electrode, and said first membrane and said second membrane being substantially saturated with a polar liquid.

10. A cylindrical cell comprising a cell free of mechanically removable fluid rolled into substantially cylindrical form, said dry cell comprising a first metal electrode, a first cation permeable ion-exchange resin membrane in direct contact with said first metal electrode, a second cation permeable ion-exchange resin membrane in direct contact with said first membrane, a second metal electrode in direct contact with said second membrane, and a sheet of insulating material in insulating contact with said second electrode, a first electrical lead connected to said first electrode, and a second electrical lead connected to said second electrode, said first membrane having as its mobile cation, a cation of the metal of which said first electrode is composed, said second membrane having as its mobile cation, a cation of the metal of which said second electrode is composed, and said second electrode being composed of a metal having an electrode potential different from the electrode potential of said first electrode, and said first membrane and said second membrane being substantially saturated with a polar liquid.

11. A cell free of mechanically removable fluid comprising a copper electrode, a first cation permeable ion-exchange resin membrane in direct contact with said copper electrode, a second cation permeable ion-exchange resin membrane in direct contact with said first membrane, and a zinc electrode in direct contact with said second membrane, said first membrane having copper ions as its mobile cation, said second membrane having zinc ions as its mobile cation, and said first membrane and said second membrane being substantially saturated with a polar liquid.

12. The cell of claim 11 in which said first membrane and said second membrane are saturated with water.

13. The cell of claim 11 in which said first membrane and said second membrane are saturated with ethylene glycol.

14. A cell free of mechanically removable fluid comprising a silver electrode, a first cation permeable ion-exchange resin membrane in direct contact with said silver electrode, a second cation permeable ion-exchange resin membrane in direct contact with said first membrane, and a zinc electrode in direct contact with said second membrane, said first membrane having as its mobile cation silver ions, said second membrane having as its mobile cation zinc ions, and said first membrane and said second membrane being substantially saturated with a polar liquid.

15. The cell of claim 14 in which said first membrane and said second membrane are substantially saturated with water.

16. The cell of claim 14 in which said first membrane and said second membrane are substantially saturated with ethylene glycol.

References Cited in the file of this patent

UNITED STATES PATENTS

| | | |
|---|---|---|
| 1,920,151 | Ruben | July 25, 1933 |
| 2,373,549 | D'Alelio | Apr. 10, 1945 |
| 2,536,699 | Ruben | June 2, 1951 |
| 2,607,809 | Pitzer | Aug. 19, 1952 |
| 2,636,851 | Juda et al. | Apr. 28, 1953 |
| 2,690,465 | Broder | Sept. 28, 1954 |
| 2,696,513 | Lehovec | Dec. 7, 1954 |
| 2,700,063 | Manecke | Jan. 18, 1955 |
| 2,747,009 | Kirkwood et al. | May 22, 1956 |
| 2,771,381 | Morehouse | Nov. 20, 1956 |